(12) United States Patent
Burdeniuc et al.

(10) Patent No.: US 10,196,476 B2
(45) Date of Patent: *Feb. 5, 2019

(54) AMINE CATALYST FOR IMPROVING THE STABILITY OF POLYURETHANE SYSTEMS HAVING HALOGEN CONTAINING BLOWING AGENTS

(71) Applicant: EVONIK DEGUSSA GMBH, Essen (DE)

(72) Inventors: Juan Jesus Burdeniuc, Colmar, PA (US); Jean Louise Vincent, Bethlehem, PA (US); Timothy J. Miller, Northampton, PA (US)

(73) Assignee: Evonik Degussa GmbH, Essen (DE)

( * ) Notice: Subject to any disclaimer, the term of this patent is extended or adjusted under 35 U.S.C. 154(b) by 177 days.

This patent is subject to a terminal disclaimer.

(21) Appl. No.: 14/437,070

(22) PCT Filed: Oct. 24, 2013

(86) PCT No.: PCT/US2013/066541
§ 371 (c)(1),
(2) Date: Apr. 20, 2015

(87) PCT Pub. No.: WO2014/066596
PCT Pub. Date: May 1, 2014

(65) Prior Publication Data
US 2015/0266994 A1 Sep. 24, 2015

Related U.S. Application Data

(63) Continuation of application No. 13/951,958, filed on Jul. 26, 2013, now Pat. No. 10,023,681.

(60) Provisional application No. 61/717,690, filed on Oct. 24, 2012, provisional application No. 61/717,690, filed on Oct. 24, 2012.

(51) Int. Cl.
| | | |
|---|---|---|
| *C08G 18/18* | (2006.01) | |
| *C08G 18/50* | (2006.01) | |
| *C08G 18/54* | (2006.01) | |
| *C08J 9/14* | (2006.01) | |
| *C08G 18/09* | (2006.01) | |
| *C08G 18/22* | (2006.01) | |
| *C08G 18/40* | (2006.01) | |
| *C08J 9/02* | (2006.01) | |
| *C08G 18/20* | (2006.01) | |

(Continued)

(52) U.S. Cl.
CPC ....... *C08G 18/1858* (2013.01); *C08G 18/092* (2013.01); *C08G 18/1825* (2013.01); *C08G 18/1833* (2013.01); *C08G 18/2027* (2013.01); *C08G 18/225* (2013.01); *C08G 18/227* (2013.01); *C08G 18/34* (2013.01); *C08G 18/4027* (2013.01); *C08G 18/5021* (2013.01); *C08G 18/546* (2013.01); *C08J 9/02* (2013.01); *C08J 9/144* (2013.01); *C08G 2101/0025* (2013.01); *C08G 2105/02* (2013.01); *C08J 2201/022* (2013.01); *C08J 2203/162* (2013.01); *C08J 2205/052* (2013.01); *C08J 2205/10* (2013.01); *C08J 2207/04* (2013.01); *C08J 2375/04* (2013.01)

(58) Field of Classification Search
CPC .............. C08G 18/092; C08G 18/1825; C08G 18/1833; C08G 18/1858; C08G 18/2027; C08G 18/225; C08G 18/227; C08G 18/34; C08G 18/4027; C08G 18/5021; C08G 18/546; C08G 2101/0025; C08G 2105/02; C08J 9/02; C08J 9/144; C08J 2201/022; C08J 2203/162; C08J 2205/052; C08J 2205/10; C08J 2207/04; C08J 2375/04
See application file for complete search history.

(56) References Cited

U.S. PATENT DOCUMENTS

| | | |
|---|---|---|
| 2,932,621 A | 4/1960 | Terry |
| 3,238,154 A | 3/1966 | Mosso |

(Continued)

FOREIGN PATENT DOCUMENTS

| | | |
|---|---|---|
| CA | 2854020 | 5/2013 |
| CN | 1031853 A | 3/1989 |

(Continued)

OTHER PUBLICATIONS

Honeywell, "Household Refrigerator: Low GWP Blowing Agent Performance Update", www.honeywell.com, CPI 2011, pp. 2-17.
International Search Report dated Feb. 26, 2014, 4 pgs.

*Primary Examiner* — John M Cooney
(74) *Attorney, Agent, or Firm* — Andrew H. Chung; Linda S. Li; Jason S. Ngui

(57) ABSTRACT

Catalyst compositions useful in the production of insulating polyurethane or polyisocyanurate foam are disclosed. The catalyst compositions impart increased stability of a mixture of the catalyst, a halogen-containing blowing agent, and a polyol. These catalyst compositions comprise of at least 10% of a tetraalkylguanidine and at least 10% of a tertiary amine catalyst with an isocyanate reactive group. These improved catalysts can be used with any halogenated blowing agent, and provide substantial stability benefits with the use of hydrofluoroolefins and hydrofluorochloroolefins. In an exemplary embodiment, a process includes providing a pre-mix comprising a hydrohaloolefin blowing agent, at least one polyol, water, and a catalyst comprising 10-50% tetramethylguanidine and 10-90% of one or more of an amine catalyst containing an isocyanate reactive group.

16 Claims, No Drawings

(51) Int. Cl.
*C08G 18/34* (2006.01)
*C08G 101/00* (2006.01)

(56) References Cited

U.S. PATENT DOCUMENTS

| | | | |
|---|---|---|---|
| 3,772,221 A | 11/1973 | Hostettler et al. | |
| 3,892,687 A | 7/1975 | Bechara et al. | |
| 3,896,052 A * | 7/1975 | Lockwood | B32B 5/20 502/167 |
| 4,025,466 A | 5/1977 | Jourquin et al. | |
| 4,464,488 A | 8/1984 | Zimmerman et al. | |
| 4,711,910 A * | 12/1987 | Statton | C08K 5/1565 521/107 |
| 4,758,605 A | 6/1988 | Williams | |
| 4,996,241 A * | 2/1991 | Eling | C08G 18/092 521/107 |
| 5,688,834 A | 11/1997 | Parker et al. | |
| 6,403,665 B1 | 6/2002 | Sieker et al. | |
| 6,825,238 B2 | 11/2004 | Hohl et al. | |
| 2006/0030633 A1 * | 2/2006 | Keske | C08G 18/089 521/99 |
| 2006/0281827 A1 | 12/2006 | Bonapersona | |
| 2007/0259773 A1 | 11/2007 | Burdeniuc et al. | |
| 2009/0099272 A1 | 4/2009 | Williams et al. | |
| 2009/0099274 A1 | 4/2009 | Van Der Puy et al. | |
| 2010/0113634 A1 | 5/2010 | Tokumoto et al. | |
| 2011/0152392 A1 | 6/2011 | Van Der Puy et al. | |
| 2012/0220677 A1 | 8/2012 | Williams et al. | |
| 2013/0190415 A1 | 7/2013 | Burdeniuc et al. | |

FOREIGN PATENT DOCUMENTS

| | | |
|---|---|---|
| CN | 101896525 A | 11/2010 |
| CN | 103717633 A | 4/2014 |
| JP | 60055018 | 3/1985 |
| JP | 63295618 | 12/1988 |
| JP | 03153721 | 7/1991 |
| JP | 2000095831 | 4/2000 |
| JP | 2001503461 | 3/2001 |
| JP | 2004529995 | 8/2003 |
| JP | 2009013247 | 1/2009 |
| JP | 2009052053 A | 3/2009 |
| JP | 2010106192 A | 5/2010 |
| JP | 2011500893 A | 1/2011 |
| JP | 2011252176 A | 12/2011 |
| JP | 2012505294 A | 3/2012 |
| JP | 2013514452 | 4/2013 |
| KR | 10-2007-0053708 | 5/2007 |
| KR | 10-2007-0093859 | 2/2009 |
| KR | 10-2012-0115982 | 10/2012 |
| WO | 9820058 A1 | 5/1998 |
| WO | 02066531 A2 | 8/2002 |
| WO | 2011038081 A1 | 3/2011 |
| WO | 2011084553 A1 | 7/2011 |
| WO | 2011084563 A2 | 7/2011 |
| WO | 2012115929 A2 | 8/2012 |
| WO | 2012115936 A2 | 8/2012 |
| WO | 2014030654 A1 | 2/2014 |

* cited by examiner

AMINE CATALYST FOR IMPROVING THE STABILITY OF POLYURETHANE SYSTEMS HAVING HALOGEN CONTAINING BLOWING AGENTS

CROSS-REFERENCE TO RELATED APPLICATIONS

This Application claims the benefit of U.S. Application No. 61/717,690, filed on Oct. 24, 2012 and application Ser. No 13/951,958 filed Jul. 26, 2013. The disclosure of Application No. 61/717,690 and Ser. No. 13/951,958 is hereby incorporated by reference.

BACKGROUND OF THE INVENTION

The field of invention is the composition and application of catalysts useful for the production of insulating polyurethane foam produced with blowing agents containing a halogen.

Polyurethane foam compositions are typically prepared by reacting an isocyanate and a premix which consists of isocyanate-reactive components such as a polyol. The premix optionally also contains other components such as water, flame retardants, blowing agents, foam-stabilizing surfactants, and catalysts to promote the reactions of isocyanate with polyol to make urethane, with water to make $CO_2$ and urea, and with excess isocyanate to make isocyanurate (trimer). The blowing agent in the premix is usually a liquid or gas with a boiling point sufficiently low to be vaporized by the heat released during the polymerization reaction. Examples of blowing agents useful in the production of insulating polyurethane foam include but are not limited to hydrofluorocarbons, hydrofluoroolefins, hydrofluorochloroolefins, hydrochlorofluorocarbons, formates, and hydrocabons. The proper selection and combination of the components in the premix and the isocyanate can be useful for the production of polyurethane foam that is spray applied, poured in place, and used in applications such as refrigerators, freezers, hot water heaters, insulation panels, garage doors, entry doors, and other various applications where insulation is desired. For some of these applications, the premix is stored for one day up to one year before being reacted with isocyanate to generate polyurethane foam. This is common in sprayfoam applications, where drums of premix and isocyanate are shipped to field locations for on-site application. Thus, it is desirable for the premix of an insulating foam formulation to be both chemically and physically stable. However, the catalysts that are useful to promote the polyurethane reaction can also participate or induce undesired reactions with the blowing agents present in the premix resulting in reduced storage stability. These undesired reactions are prevalent in blowing agents that contain halogens, and are especially problematic in halogenated blowing agents containing unsaturation and olefinic carbons. Common amine catalysts useful for the production of polyurethane foam include tertiary amines, such as N,N,N',N'',N''-pentamethyldiethylenetriamine (available from Air Products as Polycat®-5) or 1,4-diazabicyclo[2.2.2]octane (available in solution from Air Products as Dabco®33LX) which are known to accelerate the urethane reaction promoting the formation of polyurethane polymers. However, tertiary amines are also know to react with halogen containing organic compounds causing deactivation of the tertiary amine catalysts resulting in a net decrease in the kinetic of the polymerization process. Reaction between tertiary amine and halogen containing organic compounds occurs more rapidly when the halogen atom is bound to an olefinic carbon because halogen-substituted olefins are susceptible to nucleophillic attack by tertiary amines. This results in a fast deactivation of the tertiary amine catalysts rendering the premix not active enough for reaction with the isocyanate. Deactivation of tertiary amine by reaction with halogen containing compounds can also occur in halogen containing aliphatic compounds via formation of a quaternary ammonium salt or dehydrohalogenation both pathways resulting in tertiary amine deactivation.

U.S. Pat. Appl. No. 20120313035A1, which is hereby incorporated by reference in its entirety, describes a foamable composition comprising a hydrohaloolefin blowing agent and an amine catalyst that produce a stable polyol premix. The method includes the use of 1,2-dimethylimidazole, N-methylmorpholine, and other hindered tertiary amines such as diisopropylethylamine catalysts. These catalysts suffer from the drawback that they do not contain isocyanate-reactive groups and thus are emissive from the final polyurethane foam. Additionally, it is demonstrated that reactive amine catalysts such as dimethylaminoethoxyethanol and 2-[N-(dimethylaminoethoxyethyl)]-N-methylamino]ethanol result in an unstable polyol premix in the presence of a hydrohaloolefin.

U.S. Pat. Appl. No. 2013019415A1, which is hereby incorporated by reference in its entirety, describes a foamable composition comprising a non-emissive catalyst and a tetraalkyl guanidine catalyst. Specifically, the non-emissive catalyst can include 2-[N-(dimethylaminoethoxyethyl)]-N-methylamino]ethanol and dimethylaminoethoxyethanol, and the tetraalkyl guanidine can be tetramethylguanidine. The drawback being that the blowing agent composition is water, and will not produce a closed-cell insulating foam with the same insulation value as a foamable composition utilizing a halogenated blowing agent containing a hydrohaloolefin.

W.O. Pat. Appl. No. 2013116416A1 which is hereby incorporated by reference in its entirety, describes a foamable composition comprising an encapsulated amine catalyst and a hydrohaloolefin blowing agent. The drawback being that the amine catalyst is encapsulated in a solid thermoplastic polymer which must be dispersed in the polyol premix.

A process, a polyurethane composition, a polyurethane product, a process of producing a catalyst composition, and a catalyst that do not suffer from one or more of the above drawbacks would be desirable in the art.

BRIEF SUMMARY OF THE INVENTION

In an exemplary embodiment, a process comprises providing a premix comprising at least one tetraalkylguanidine and at least one tertiary amine containing an isocyanate reactive group in the pre-mix wherein the pre-mix contains at least one of the blowing agents hydrofluorocarbons, hydrochlorocarbon, hydrochloroolefin, hydrofluoroolefins, hydrofluorochloroolefins, fluoroolefin, and chloroolefin, hydrochlorofluorocarbons.

In another exemplary embodiment, a polyurethane composition comprises at least one polyol component, a catalyst composition, and at least one isocyanate component. The catalyst composition comprises at least one tetraalkylguanidine and at least one tertiary amine containing an isocyanate reactive group.

In another exemplary embodiment, a polyurethane product comprises being formed by tetraalkylguanidine and at least one tertiary amine containing an isocyanate reactive group and an isocyanate component.

One aspect of the invention relates to a polyol premix composition comprising at least one halogenated blowing agent, at least one polyol, water, at least one tetraalkylguanidine and at least one tertiary amine containing an isocyanate reactive group in the pre-mix.

One aspect of the invention relates to a polyol premix composition in which the halogenated blowing agent contains a hydrohaloolefin.

One aspect of the invention relates to any of the foregoing aspects wherein the hydrohaloolefin blowing agent comprises trans-1-chloro-3,3,3-trifluoropropene.

One aspect of the invention relates to any of the foregoing aspects wherein the amine with an isocyanate reactive group comprises at least one member selected from the group consisting of N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-dimethyl-N',N'-2-hydroxy (propyl)-1,3-propylenediamine, dimethylaminopropylamine, (N,N-dimethylaminoethoxy)ethanol, methyl-hydroxyethyl-piperazine, bis(N,N-dimethyl-3-aminopropyl)amine, N,N-dimethylaminopropyl urea, N,N'-bis(3-dimethylaminopropyl)urea, bis(dimethylamino)-2-propanol, N-(3-aminopropyl)imidazole), N-(2-hydroxypropyl)imidazole, and N-(2-hydroxyethyl) imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether or combinations thereof.

One aspect of the invention relates to any of the foregoing aspects that further comprises at least one solvent.

A further aspect of the invention relates to any of the foregoing aspects wherein the solvent comprises at least one member selected from the group consisting of a glycol, water, and a polyol.

In one aspect of the invention relates to any of the foregoing aspects wherein the tetraalkylguanidine comprises tetramethylguanidine.

A further aspect of the invention relates to any of the foregoing aspects further comprising an amine catalyst without an isocyanate reactive group.

A further aspect of the invention relates to any of the foregoing aspects further comprising a metal catalyst.

Another aspect of the invention relates to any of the foregoing aspects further comprising at least one cell stabilizer.

Another aspect of the invention relates to any of the foregoing aspects further comprising at least one crosslinking agent.

Another aspect of the invention relates to any of the foregoing aspects further comprising at least one chain extender.

A further aspect of the invention relates to any of the foregoing aspects comprising catalyst composition of about 10 to 50% tetramethylguanidine and about 10 to 90% of one amine with an isocyanate reactive group.

A further aspect of the invention relates to any of the foregoing aspects wherein the catalyst comprises about 0.1 to about 10% of the polyol premix composition.

A further aspect of the invention relates to any of the foregoing aspects wherein the catalyst comprises about 0.5 to about 5% of the polyol premix composition.

One aspect of the invention relates to a method for making foam comprising contacting the pre-mix composition of any of the foregoing aspects with at least one isocyanate.

A further aspect of the invention relates to a foam obtained by the foregoing method or any of the foregoing aspects.

One aspect of the invention relates to any of the foregoing aspects wherein the polyol premix composition comprising at least one halogenated blowing agent, at least one polyol, water, and a catalyst comprising at least 10% tetraalkylguanidine and about 10 to about 90 wt % of one or more of a tertiary amine catalyst with an isocyanate reactive group.

One aspect of the invention relates to any of the foregoing aspects wherein the pre-mix composition further comprises about 10 to about80 wt % of a tertiary amine catalyst that does not have an isocyanate reactive group.

One aspect of the invention relates to any of the foregoing aspects wherein the tertiary amine catalyst that does not have an isocyanate reactive group is 1,2-dimethylimidazole.

One aspect of the invention relates to any of the foregoing aspects wherein pre-mix composition comprises a catalyst comprising equal amounts of tetramethylguanidine, dimethylaminoethoxyethanol, and a solution of about 70 wt % 1,2-dimethylimidazole in a glycol.

One aspect of the invention relates to any of the foregoing aspects wherein the catalyst comprises equal amounts of tetramethylguanidine and N,N-dimethylaminoethyl-N'-methyl ethanolamine.

One aspect of the invention relates to any of the foregoing aspects wherein the pre-mix composition further comprises at least one metal catalyst.

One aspect of the invention relates to any of the foregoing aspects wherein the metal catalyst comprises at least one organotin compound.

Another aspect of the invention relates to any of the foregoing aspects wherein the metal catalyst comprises a carboxylate complex of one or more of potassium, bismuth or sodium.

Another aspect of the invention relates to any of the foregoing aspects further comprising a quaternary ammonium salt.

A further aspect of the invention relates to a method that uses any of the foregoing aspects of the invention for improving the stability of a premix comprising at least one hydrohaloolefin and at least one amine catalyst by utilizing an amount of at least one tetraalkylguanidine that increases the stability of the premix.

A further aspect of the invention relates to a method that uses any of the foregoing aspects in a method wherein the amine catalyst comprises at least about 10 wt % tetramethylguanidine and about 10 wt % of a tertiary amine catalysts that has an isocyanate reactive group.

A further aspect of the invention relates to the use of tetraalkylguanidine to improve the stability of a composition comprising at least one hydrooolefin and at least one tertiary amine catalyst in any of the foregoing aspects.

Other features and advantages of the present invention will be apparent from the following more detailed description of the preferred aspect or embodiment, taken in conjunction with the accompanying examples which illustrate, by way of example, the principles of the invention. These features as well as the various aspects disclosed herein can be used alone or in combinations with each other.

DETAILED DESCRIPTION OF THE INVENTION

Provided is an exemplary process, a polyurethane composition, a polyurethane product, a process for making polyurethane foam, a process of producing a catalyst composition, and a catalyst. Embodiments of the present disclosure improve the stability of a premix by minimizing the decomposition of the halogen-containing blowing agent, reducing catalysts deactivation by such decomposition process while providing enough catalytic activity as to provide foam rising speeds that are acceptable for practical use as well as finished products with optimum physical properties. By "stability" it is meant that the pre-mix containing all components of a foamable composition, except isocyanate, after being thermally aged in an oven set at 50° C. (in a sealed container) for 2 weeks will be sufficiently active after aging as to produce foam. During the aging process decomposition of a hydrofluoroolefin (HFO) blowing agent can occur thereby causing the pre-mix to lose its activity. This deactivation can be measured using standard FOMAT equipment and measuring foam rate of rise profiles which consist of recording height versus time as well as foam rise speed versus time during the course of the polymerization process. One suitable way to measure deactivation is by monitoring changes in the time in seconds to reach the time at which the foam has risen to 80% of the maximum height achieved at different periods of time during the aging process. Improvements in catalyst performance can then be measured by recording the changes $\Delta T = T_{aged} - T_{initial}$. For example, a formulation that takes 20 seconds to reach 80% of the maximum height achieved when initially prepared, may experience a reactivity decay after storage at 50° C. for two weeks, and then take 30 seconds to reach 80% of the maximum height achieved (as measured by the FOMAT equipment). The $\Delta T$ would then be 10 seconds. Thus, when comparing catalyst compositions, smaller changes in $\Delta T$ are desired because such smaller changes are associated with lower activity losses during the aging process. Smaller changes in $\Delta T$ means, for example, that a suitable spray foam formulation can still produce foam after aging without the need of adding extra fresh catalyst to the premix to prevent sagging, dripping, or collapse of the reactive mixture during application. In order to have a stable foam formulation, it is preferable to have a $\Delta T$ change in reactivity of less than about 7 seconds. It is more preferable to have a $\Delta T$ change in reactivity of less than about 5 seconds, less than about 4 seconds and in some cases less than about 3 seconds.

The inventive catalysts are useful for the production of any rigid insulating foam, and are particularly useful for spray applied foam, appliance insulation, insulating construction panels, and various other insulation products containing closed-cell rigid polyurethane foam. This invention includes foams that have an isocyanate index between about 70 and about 500, about 90 to about 270 and typically about 100 to about 150. The catalysts described in this invention could be used in combination with any halogen-containing blowing agent to provide improved system stability, but they are particularly useful for improving the stability of systems containing hydrohaloolefin blowing agents, such as at least one of HFCO-1234ze (trans-1,3,3,3-Tetrafluoroprop-1-ene) and HFCO-1233zd (1-Propene, 1-chloro-3,3,3-trifluoro), among other HFOs.

In one embodiment, the premix comprises the polyol component, at least one surfactant component and at least one blowing agent component. The polyols component comprises one or more standard polyols, one or more natural oil polyols, one or more polyester polyols, one or more Mannich polyols or combinations thereof. Mannich bases are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. The amount of surfactant can range from about 0.10 pphp to about 10 pphp, about 0.20 pphp to about 8.0 pphp and in some cases about 0.5 pphp to about 3.0 pphp. The blowing agent components can range from about 1 pphp to about 30 pphp, about 5 pphp to about 20 pphp and in some cases about 8 pphp to about 15 pphp. The premix can be formed by using any suitable conditions such as mixing all the components in a commercially available reaction vessel equipped with a mechanical agitator or simply mixing all the premix components in a drum and mechanically mixing the components inside the drum before sealing.

In one embodiment, the standard polyol is used alone, includes polyether polyol. In one embodiment the standard polyol is used in the range about 0 pphp to about 100 pphp, about 0 pphp to about 80 pphp and in some cases about 20 pphp to about 60 pphp. In one embodiment, the natural oil polyol is at an amount of greater than about 0 to about 40 pphp, greater than about 0 to about 20 pphp and in some cases greater than about 0 pphp to about 10 pphp. In one embodiment, the standard polyol is used alone and it is a polyester polyol. In one embodiment, the polyester polyol is used at an amount of about 0 pphp to 100 pphp, about 10 pphp to about 80 pphp and in some cases about 20 pphp to about 60 pphp. In one embodiment the Mannich polyol is used in combination with other polyol and in a range from 0 pphp to 80 pphp, about 0 pphp to about 50 pphp and in some cases about 0 pphp to about 20 pphp.

In one embodiment, the premix further comprises at least one of water, cell stabilizers, chain extenders, pigments, fillers, organic acids or diacids, flame retardants, auxiliary urethane gelling catalysts, auxiliary urethane blowing catalysts, transition metal catalysts, or combinations thereof. As is further described below, in some embodiments, the premix includes further components that are combined through any suitable procedures and using equipment known in this art including those previously described and/or at any suitable portion of the process.

Suitable cell stabilizers include, but are not limited to, silicone surfactants, anionic surfactants, or combinations thereof. In one embodiment, the cell stabilizer is the silicone surfactant, such as, polyalkylsiloxane, polyoxyalkylene polyol-modified dimethylpolysiloxane, alkylene glycol-modified dimethylpolysiloxane, or combinations thereof. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof. In one embodiment, the premix includes the cell stabilizers at a suitable predetermined amount. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. Suitable predetermined amounts include, but are not limited to, about 0.1 pphp to about 20 pphp, 0.1 pphp to about 10 pphp, 0.1 pphp to about 5 pphp, or any suitable combination or sub-combination thereof.

Suitable pigments include, but are not limited to, organic pigments, inorganic pigments, or combinations thereof. The pigments permit coloring (for example, to match a color grade), concealing (for example, to conceal yellowing), or combinations thereof. In one embodiment with the pigment being an organic pigment, the pigment is an azo/diazo dye, a phthalocyanine, dioxazine, carbon black, or combination thereof. In one embodiment with the pigment being an inorganic pigment, the pigment is titanium dioxide, iron oxide, chromium oxide, or a combination thereof. The amount of pigment can range from about 0 pphp to about 10 pphp, about 0 pphp to about 5 pphp and in some cases about 0.1 pphp to about 3.0 pphp.

Suitable fillers increase the density and load bearing properties of polyurethane foams. In one embodiment, the filler is barium sulfate, calcium carbonate, or a combination thereof. The amount of filler can range from about 0 pphp to about 20 pphp, about 0 pphp to about 10 pphp and in some cases about 1.0 pphp to about 5.0 pphp.

Suitable flame retardants reduce the flammability of polyurethane foams. In one embodiment, the flame retardant is a chlorinated phosphate ester, chlorinated paraffin, a melamine powder, or a combination thereof. In one embodiment, the premix includes the flame retardants at any suitable amount. Suitable amounts include, but are not limited to, about 0 pphp to about 30 pphp, about 0 pphp to about 20 pphp, about 0 pphp to about 10 pphp, about 1 pphp to about 20 pphp, about 1 pphp to about 10 pphp, about 1 pphp to about 5 pphp, or any suitable combination or sub-combination thereof.

In one embodiment, the composition produced is the polyurethane composition. In this embodiment, the process involves reacting the premix, having the tetraalkylguanidine and the tertiary amine having an isocyanate reactive group, with the isocyanate to form the polyurethane composition. The forming of the polyurethane composition includes combining an isocyanate component with the premix. The combining is for a predetermined duration (for example, about 6 seconds), at a predetermined blade rotation speed (for example, about 6,000 revolutions per minute), or a combination thereof. Alternatively, the forming of the polyurethane composition includes combining an isocyanate component with the premix utilizing a commercially available spraying foam equipment which consists on contacting all the components at high pressure in a mixing head of a spraying machine.

In one embodiment, the isocyanate component is combined with the premix composition at or about a stoichiometric ratio. In one embodiment, the stoichiometric ratio is based upon an NCO index. The NCO index is the number of equivalents of the isocyanate, divided by the total number of equivalents of active hydrogen, multiplied by 100 (for example, based upon an NCO index being [NCO/(OH+NH)]*100). The polyurethane composition includes the NCO index being within a predetermined range. In one embodiment, the predetermined range is between about 20 and about 500. In one embodiment, where the polyurethane composition is used for producing a spray foam application, the range is between about 20 and about 500. For other applications, the NCO index can range from about 50 to about 300 about 80 to about 250 and about 90 to about 150. In one embodiment, the polyurethane composition is used with a trimerization catalyst to produce polyisocyanurate foams use in foam laminates and includes a range suitable for the use.

The isocyanate component includes any suitable organic isocyanate compound. Suitable organic isocyanate compounds include, but are not limited to, at least one of hexamethylene diisocyanate (HDI), phenylene diisocyanate (PDI), toluene diisocyanate (TDI), 4,4'-diphenylmethane diisocyanate (MDI), isophoronedi-isocyanate (IPDI), or combinations thereof. In one embodiment, the isocyanate component includes 2,4-TDI, 2,6-TDI, or a combination thereof. In one embodiment, the isocyanate component includes, by weight, about 80% 2,4-TDI and about 20% or a remainder 2,6-TDI. In one embodiment, the isocyanate component includes crude MDI, such as, a mixture of about 60% 4,4'-MDI and/or a stoichiometric amount along with other isomeric and analogous higher polyisocyanates. Other suitable isocyanates are shown and described in U.S. Pat. No. 4,394,491, which is hereby incorporated by reference in its entirety.

In one embodiment, the premix includes, by weight, at least about 20% of polyol between about 0.5% and about 10% of surfactant, between about 1% and about 30% being the blowing agent component, between about 0.25% and about 15% being the catalyst composition, with the amount of the isocyanate component being based upon the NCO index being between about 20 and about 500. In a further embodiment, the polyol component includes polyether polyol, a natural oil polyol and/or a polyester polyol. In one embodiment, the polyether polyol has an average molecular weight between about 500 and about 20,000 and/or a hydroxyl number between about 400 and about 10 and more preferably an average molecular weight between 2000 and 5000 and/or hydroxyl number between about 50 and about 20.

In one embodiment, the premix include(s) about 100 pphp of the polyol component (for example, about 70 pphp being a polyester polyol and/or about 30 pphp being a Mannich polyol), about 2.0 pphp being the surfactant component, about 1.5 pphp being water, and the isocyanate component having an NCO index of about 180. The premix also include(s) the catalyst composition of the invention. In a further embodiment, the premix include(s) about 30 pphp of the flame retardant (for example, tris-(2-chloropropyl)phosphate), 20 pphp of blowing agent, 1.0 pphp metal catalyst and 0.10 pphp to 10 pphp trimerization catalyst.

The base polyol in the premix reacts with the isocyanate to produce the polyurethane foam composition. In one embodiment, the base polyol is a polyether polyol. Suitable polyether polyols are shown and described in WO 03/016373 A1, WO 01/58976 A1, WO 04/060956 A1, WO 03/016372 A1, and WO 03/055930 A1, each of which are hereby incorporated by reference in their entirety. In one embodiment, the polyether polyols are poly(alkylene oxide) polymers, such as, poly(ethylene oxide), poly(propylene oxide), and/or compolymers with terminal hydroxyl groups derived from polyhydric compounds (for example, diols and triols). In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or combinations thereof. In one embodiment, the polyether polyol is or includes polyhydroxy-terminated acetal resin, hydroxy-terminated amine, hydroxyl-terminated polyamine, or a combination thereof. In one embodiment, the base polyol is or includes polyalkylene carbonate-based polyols, phosphate-based polyols, or combinations thereof.

In one embodiment, the base polyol comprises a single high molecular weight polyether polyol. In another embodiment, the base polyol comprises a mixture of high molecular weight polyether polyols, each having a different molecular weight or different chemical composition. In this embodiment, the base polyol comprises di-functional and tri-functional materials, such as, but not limited to, polyethylene glycol, polypropylene glycol, glycerol-based polyether triols, trimethylolpropane-based polyether triols, other similar compounds or mixtures, or combinations thereof.

In one embodiment, the polyurea modified polyol is formed by the reaction of a diamine and a diisocyanate in the presence of the starting polyol. In this embodiment, the polyurea modified polyol includes polyurea dispersion. In one embodiment, the polyurea modified polyol is or includes polyisocyanate poly addition (PIPA) polyols, for example, formed in situ from a reaction of the isocyanate and an alkanolamine in the starting polyol.

In one embodiment, the base polyol is or includes a natural oil polyol. Generally, the natural oil polyols are less expensive and from renewable resources, thereby providing environmental benefits. The natural oil polyols include triglycerides of saturated and/or unsaturated acids having a carbon chain length between 12 and 24. The saturated acids are lauric acid, myristic acid, palmitic acid, steric acid, arachidic acid, lignoceric acid, or a combination thereof. The unsaturated acids are mono-unsaturated (for example, palmitoleic acid, oleic acid, or a combination thereof) and/or poly-unsaturated (for example, linoleic acid, linolenic acid, arachidonic acid, or a combination thereof). One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

In one embodiment, the natural oil polyol used as or in the base polyol is castor oil. The castor oil is a natural triglyceride of ricinoleic acid having a low hydroxyl content.

In one embodiment, a natural oil or fat is modified to form the natural oil polyol. In this embodiment, an epoxidized natural oil is reacted with a ring opening acid catalyst and a ring opener. The epoxidized natural oil is a plant-based oil, such as epoxidized vegetable oil and/or epoxidized animal fat. Suitable epoxidized natural oils that are plant-based oils include, but are not limited to, soybean oil, corn oil, sunflower oil, olive oil, canola oil, sesame oil, palm oil, rapeseed oil, tung oil, cottonseed oil, safflower oil, peanut oil, linseed oil, or a combination thereof. Suitable epoxidized natural oils that are epoxidized animal fat are fish fat, tallow, lard, or a combination thereof. Other suitable epoxidized natural oils are shown and described in WO 06/116456 A1, which is hereby incorporated by reference in its entirety.

In one embodiment, the natural oil or the fat is modified by increasing hydroxy content through chemical reaction at unsaturated sites and/or at ester functional groups. For example, in one embodiment, the unsaturated sites are hydroxylated via epoxidation/ring opening and/or hydroformylation/hydrogenation. In one embodiment, the ring opening of the epoxidized natural oil is with alcohol, water, and other compounds having one or more nucleophilic groups. In a further embodiment, the epoxidized natural oil is also oligomerized. In one embodiment, the hydroformylation/hydrogenation of the epoxidized natural oil is in a reactor (not shown) filled with a hydrogen/carbon monoxide mixture in the presence of a suitable catalyst (for example, cobalt, rhodium, or combinations thereof) to form an aldehyde that is hydrogenated in the presence of a cobalt catalyst or a nickel catalyst to form a polyol.

In one embodiment, ester functional groups in suitable reactants are modified by trans-esterification to introduce hydroxy groups. In this embodiment, a suitable poly-hydroxy containing substance and trans-esterification catalyst (for example, an alkali metal or alkali earth metal base or salt) produce the polyol of the natural oil or fat. The trans-esterification includes any suitable natural oil or partially hydrogenated oil. Suitable natural oils include, but are not limited to, soybean, corn, cottonseed, peanut, castor, sunflower, canola, rapeseed, safflower, fish, seal, palm, tung, olive oil, or combinations thereof. Suitable multifunctional hydroxyl compounds include, but are not limited to, lactose, maltose, raffinose, sucrose, sorbitol, xylitol, erythritol, mannitol, or combinations thereof.

In one embodiment, the polyol component includes polyols typically used for making rigid PIR/PUR (polyisocyanurate and/or polyurethane) foam. Such polyols include, but are not limited to, polyalkylene ether and polyester polyols. In one embodiment, the polyalkylene ether includes a poly (alkyleneoxide) polymer, such as, poly(ethyleneoxide) and poly(propyleneoxide) polymers and copolymers with terminal hydroxyl groups derived from polyhydric compounds including diols and triols, for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or combinations thereof. In another embodiment, the polyol component includes amine polyether polyols that can be prepared when an amine, such as ethylenediamine, diethylenetriamine, tolylenediamine, diphenylmethanediamine, triethanolamine, or the like, is reacted with ethylene oxide or propylene oxide. In one embodiment directed to spray foam formulation, the polyol component includes polyether polyols, thereby increasing reactivity of the polyurethane composition. In one embodiment, the polyether polyols are prepared by condensation of phenol with formaldehyde in the presence of hydroxyl-containing amines such as diethanolamine, ethanolamine, and the like.

In one embodiment, the polyol component includes a single high molecular weight polyether polyol. Additionally or alternatively, in one embodiment, mixtures of high molecular weight polyether polyols, such as mixtures of different multifunctional materials and/or different molecular weight or different chemical composition, are included in the polyol component.

In one embodiment, the polyol component includes a polyester polyol produced when a dicarboxylic acid is reacted with an excess of a diol, for example, adipic acid, phathalic acid, phthalic anhydride with ethylene glycol, diethylene glycol, polyethylene glycol, propylene glycol, dipropylene glycol, polypropylene glycol or butanediol, or when a lactone is reacted with an excess of a diol, such as, caprolactone with propylene glycol.

The total amount of polyol, including blends thereof, can range from about 10% to about 80%, about 20% to about 60% and about 30% to about 50 wt % of the pre-mix.

In one embodiment, the polyurethane composition includes improved foam kinetics when the premix is aged or heat aged (e.g., aged by allowing the premix stand over a period of time and monitoring the activity periodically as to determine the activity loss for example by measuring the increase the time in seconds to reach 80% of the maximum foam height (T) or heat aged by placing the premix in an heated and conditioned oven at 50° C. over a period of time and measuring periodically the reactivity loss in the same manner. Such properties include, but are not limited to, a minimal change in the time for maximum foam rise speed when aging the premix in an oven at 50° C. (for example, a ΔT of less than 5 seconds after 14 days storage at 50° C. is acceptable).

In one embodiment, the catalyst composition comprises a mixture of 10 to 50 wt % tetramethylguanidine (e.g., about 0.1 to about 1.5 pphp), combined with a tertiary amine catalyst with an isocyanate reactive group (e.g., about 0.1 to about 3.0 pphp). The weight ratio of tetraalkylguanidine (e.g., tetramethylguanidine) to amine catalyst can range from about 1 to about 9, about 1 to about 1 and in some cases about 1 to about 2. Suitable amine catalysts with isocyanate reactive groups include, but are not limited to, N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-dimethyl-N',N'-2-hydroxy(propyl)-1,3-propylenediamine, dimethylaminopropylamine, (N,N-dimethylaminoethoxy) ethanol, methyl-hydroxy-ethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl)imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl) ether or combinations thereof.

In another embodiment, the catalyst composition comprises a mixture of at least 10% of a tetraalkylguanidine, at least 10% of a tertiary amine catalyst with an isocyanate reactive group, and at least 10% of a tertiary amine catalyst that does not have either a guanidine or an isocyanate reactive group (e.g., 0.1 pphp). Suitable tertiary amine catalysts that do not have isocyanate reactive groups comprise at least one member selected from the group consisting of dimethylcyclohexylamine, dicyclohexylmethylamine, pentamethyldiethylenetriamine, bis(3-dimethylaminopropyl)-N,N-dimethylpropanediamine, N-hexadecyl-N,N-dimethylamine, 1,2-dimethylimidazole, 1-methylimidazole, 2-methylimidazole, 2-isopropylimidazole, 2-ethyl-4-methylimidazole and mixtures thereof.

The catalyst composition can comprise about 0.1 pphp to about 10 pphp of the polyol premix, preferably the catalyst composition comprises about 0.5 pphp to about 6 pphp of the polyol premix (e.g., about 0.3 to about 4 wt. % of the premix).

In one embodiment, the tertiary amine catalyst component is used in conjunction with a transition metal catalyst. For example, in one embodiment, the tertiary amine catalyst component is used with an organotin compound, tin(II) carboxylate salts, bismuth(III) carboxylate salts, or combinations thereof. Examples of metal catalysts such as organotin compounds or bismuth carboxylates can comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

In one embodiment, the tertiary amine catalyst component is used in conjunction with a trimer catalyst. For example, in one embodiment, the tertiary amine catalyst component is used with potassium carboxylate salts, ammonium carboxylate salts, or combinations thereof. Examples of trimer catalysts include potassium octoate, tetraalkylammonium carboxylates, and pivalate, acetate, or octoate salts of potassium or sodium.

The following Examples are provided to illustrate certain embodiments of the invention and do not limit the scope of the claims appended hereto.

EXAMPLE 1 (Comparative)

Evaluation of Formulations Containing Conventional Amine Catalysts in the Presence of HFO as Blowing Agent trans-1-chloro-3,3,3-trifluoropropene in Formulation A Foams may be made according to the methods known in the art using typical polyurethane formulations to which have been added a urethane catalyst comprising one or more alkyl tertiary amines. The amount of polyisocyanate used in polyurethane formulations according to the invention is not limited, but it will typically be within those ranges known to those of skill in the art. Exemplary ranges are given in the tables, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]×100

In some embodiments of the invention, the catalyst composition may be combined into a package with one or more polyester polyols, and optionally with one or more blowing agents and/or other additives commonly used in polyurethane formation. Examples of these other optional components have been listed previously, and they do not affect the basic nature of the invention. Such mixtures may subsequently be combined with an organic isocyanate to form polyurethane foam, again optionally in the presence of other additives known in the art. In addition to making rigid spray foams, the invention may also be used to prepare other rigid foams that are commonly utilized for many industrial applications such as appliances, laminate panels for construction and insulation.

TABLE 1

Spray Rigid Foam Formulation A

| Formulation A | PPHP |
| --- | --- |
| ¹Polyester Polyol | 50 |
| ²Polyether Polyol | 50 |
| Fire Retardant (2-chloropopylphosphoester) | 20 |
| ³Dabco ® PM300 | 3.00 |
| ³Dabco ® DC193 | 0.64 |
| Catalyst | Variable |
| water | 3.0 |
| Blowing agent | 10 |

¹A standard commercially available polyester polyol with an average equivalent weight of 184; average functionality of 2.2 and OH# of 305;
²A standard commercially available nonyl phenol initiated Mannich polyol with a MW of approximately 400, OH# of 470, average functionality of 3.3;
³DABCO ®PM300 and DABCO ®DC193 aredimethylpolysiloxane (polyoxyethyleneglycol) silicone copolymer surfactants commercially available from Air Products & Chemicals.

Table 1 above shows typical rigid spray foam Formulation A used to evaluate different catalysts. Approximately 100 g of the above premix were added to a plastic vessel, closed off, and conditioned in an oven, in a sealed container, at 50° C. for either 7 or 14 days. The samples were allow to reach equilibrium at room temperature and then were mixed with the corresponding amount of isocyanate, typically about 25 g of polyol premix and 25 g of isocyanate, under vigorous mechanical stirring provided by a mechanical mixing blade at about 3000 rpm. Foam rise was measured under sonar detection equipment (FOMAT model no V3.5 and standard software included with the FOMAT equipment) and choice time was recorded for each case. Choice times were measured in seconds and it represents the time it takes each foaming mass to reach 80% of the full height. T1 is recorded as the choice time for a premix that was assembled and immediately foamed, and T2 is the choice time after 7 days of conditioning at 50° C., and T3 is the choice time after 14 days of conditioning at 50° C. The ΔT is the reactivity decay or the difference between T3 and T1. Under these conditions, a ΔT of less than 5 seconds is desired to have suitable system stability. As illustrated by the table below, the standard amine catalysts Polycat® 5 and Dabco®33LX show a significant loss in reactivity upon aging as evident by the high ΔT.

| Catalyst | Use level (PPHP) | T1 (seconds) | T2 (seconds) | T3 (seconds) | ΔT (T3 − T1) |
| --- | --- | --- | --- | --- | --- |
| POLYCAT ®-5 (pentamethyldiethylenetriamine) | 2.83 | 12 | 17 | 22 | 10 |
| DABCO ®-33LX (33% solution of triethylenediamine in MP-diol) | 2.83 | 33 | 49 | 48 | 15 |

EXAMPLE 2 (Comparative)

Evaluation of Formulations Containing Either Tetramethyl Guanidine Catalyst in the Absence of a Second Amine Catalyst with Isocyanate Reactive Groups in the Presence of HFO as Blowing Agent trans-1-chloro-3,3,3-trifluoropropene in Formulation A In this example the tetramethyl guanidine is utilized as the sole amine catalyst in the Formulation A described in Example 1 and is found to exhibit poor stability when aged at 50° C. for two weeks, with a ΔT of 9 seconds.

| Catalyst | Use level (PPHP) | T1 (seconds) | T2 (seconds) | T3 (seconds) | ΔT (T3 − T1) |
| --- | --- | --- | --- | --- | --- |
| Tetramethylguanidine | 2.83 | 14 | 23 | 23 | 9 |

EXAMPLE 3 (Comparative)

Evaluation of Formulations Containing an Amine Catalyst with Isocyanate Reactive Groups in the Absence of Tetramethylguanidine in the Presence of HFO as Blowing Agent trans-1-chloro-3,3,3-trifluoropropene in Formulation A In this example the N,N-dimethylaminoethyl-N'-methyl ethanolamine, dimethylaminoethoxyethanol, N-[2-[2-(Dimethylamino)ethoxy]ethyl]-N-methyl-1,3-propanediamine, or combination of these catalysts, were utilized as the sole amine catalyst in the Formulation A described in Example 1 in the absence of tetramethylguanidine and found to exhibit poor stability when aged at 50° C. for two weeks, with a ΔT of >5 seconds.

| Catalyst | Use level (PPHP) | T1 (seconds) | T2 (seconds) | T3 (seconds) | ΔT (T3 − T1) |
|---|---|---|---|---|---|
| N,N-dimethylaminoethyl-N'-methyl ethanolamine | 2.83 | 20 | 27 | 31 | 11 |
| Dimethylaminoethoxyethanol | 2.83 | 21 | 26 | 29 | 8 |
| N-[2-[2-(Dimethylamino)ethoxy]ethyl]-N-methyl-1,3-propanediamine | 2.83 | 20 | 24 | 29 | 9 |
| A blend of 25% N,N-dimethylaminoethyl-N'-methyl ethanolamine and 75% dimethylaminoethoxyethanol | 2.83 | 21 | 26 | 29 | 8 |

EXAMPLE 4 (Inventive)

Evaluation of Formulations Containing an Amine Catalyst with Isocyanate Reactive Groups Combined with Tetramethylguanidine in the Presence of HFO as Blowing Agent trans-1-chloro-3,3,3-tritluoropropene in Formulation A In this example N-[2-[2-(Dimethylamino)ethoxy]ethyl]-N-methyl-1,3-propanediamine was utilized in combination with tetramethylguanidine in the Formulation A described in Example 1 and unexpectedly found to exhibit improved stability when aged at 50° C. for two weeks, with a ΔT of <5 seconds.

| Catalyst | Use level (PPHP) | T1 (seconds) | T2 (seconds) | T3 (seconds) | ΔT (T3 − T1) |
|---|---|---|---|---|---|
| A blend of 70% N-[2-[2-(Dimethylamino)ethoxy]ethyl]-N-methyl-1,3-propanediamine and 30% Tetramethylguanidine | 2.83 | 21 | 23 | 25 | 4 |

EXAMPLE 5 (Inventive)

Evaluation of Formulations Containing an Amine Catalyst with Isocyanate Reactive Groups Combined with tetramethylguanidine in the Presence of HFO as Blowing Agent trans-1-chloro-3,3,3-tritluoropropene in Formulation A In this example N,N-dimethylaminoethyl-N'-methyl ethanolamine is utilized in combination with tetramethylguanidine in the Formulation A described in Example 1 and can exhibit improved stability when aged at 50° C. for two weeks, with a ΔT of <5 seconds.

| Catalyst | Use level (PPHP) | T1 (seconds) | T2 (seconds) | T3 (seconds) | ΔT (T3 − T1) |
|---|---|---|---|---|---|
| A blend of 50% N,N-dimethylaminoethyl-N'-methyl ethanolamine and 50% Tetramethylguanidine | 2.83 | 20 | 23 | 24 | 4 |

EXAMPLE 6 (Inventive)

Evaluation of Formulations Containing an Amine Catalyst with Isocyanate Reactive Groups Combined with Tetramethylguanidine in the Presence of HFO as Blowing Agent trans-1-chloro-3,3,3-trifluoropropene in Formulation A In this example Dimethylaminoethoxyethanol is utilized in combination [2,4,6-Tris (dimethylaminomethyl) phenol] with tetramethylguanidine in the Formulation A described in Example 1 and can exhibit improved stability when aged at 50° C. for two weeks, with a ΔT of <5 seconds.

| Catalyst | Use level (PPHP) | T1 (seconds) | T2 (seconds) | T3 (seconds) | ΔT (T3 − T1) |
|---|---|---|---|---|---|
| A blend of 33% Dimethylaminoethoxyethanol 33% Tetramethylguanidine and 34% [2,4,6-Tris (dimethylaminomethyl) phenol] | 2.83 | 22 | 24 | 26 | 4 |

EXAMPLE 7 (Inventive)

(Evaluation of Formulations Containing an Amine Catalyst with Isocyanate Reactive Groups Combined with Tetramethylguanidine and a Third Tertiary Amine Catalyst in the Presence of HFO as Blowing Agent trans-1-chloro-3,3,3-trifluoropropene in Formulation A In this example the dimethylaminoethoxyethanol was utilized in combination with tetramethylguanidine and a third amine catalyst 1,2-dimethylimidazole in the Formulation A described in Example 1 and unexpectedly found to exhibit improved stability when aged at 50° C. for two weeks, with a ΔT of <5 seconds.

| Catalyst | Use level (PPHP) | T1 (seconds) | T2 (seconds) | T3 (seconds) | ΔT (T3 − T1) |
|---|---|---|---|---|---|
| A blend of 33% Dimethylaminoethoxyethanol, 33% tetramethylguanidine, 24% 1,2-dimthylimidazole, and 10% Dipropylene glycol | 2.83 | 18 | 22 | 21 | 3 |

EXAMPLE 8 (Comparative)

Evaluation of Formulations Containing Conventional Amine Catalysts in the Presence of HFO as Blowing Agent trans-1-chloro-3,3,3-trifluoropropene in Formulation B Formulation B shown in Table 2 is representative of a rigid spray foam formulation that contains both an amine catalyst component and a metal catalyst component.

TABLE 2

Spray Rigid Foam Formulation B

| Formulation B | PPHP |
|---|---|
| [1]Polyester Polyol | 70 |
| [2]Polyether Polyol | 30 |
| Fire Retardant (2-chloropopylphosphoester) | 21 |
| [3]Dabco ® PM300 | 3.00 |
| [3]Dabco ® DC193 | 0.64 |
| Amine Catalyst | Variable |
| Metal Catalyst | 0.35 |
| Water | 2.5 |
| Blowing agent | 10 |

[1]A standard commercially available polyester polyol with an average equivalent weight of 184; average functionality of 2.2 and OH# of 305;
[2]A standard commercially available nonyl phenol initiated Mannich polyol with a MW of approximately 400, OH# of 470, average functionality of 3.3;
[3]DABCO ®PM300 and DABCO ®DC193 aredimethylpolysiloxane (polyoxyethyleneglycol) silicone copolymer surfactants commercially available from Air Products & Chemicals.

Approximately 100 g of the above premix were added to a plastic vessel, closed off, and conditioned in an oven at 50° C. for either 7 or 14 days. The samples were allowed to reach equilibrium at room temperature and then were mixed with the corresponding amount of isocyanate, typically about 25 g of polyol premix and 25 g of isocyanate, under vigorous mechanical stirring provided by a mechanical mixing blade at about 3000 rpm. Foam rise was measured under sonar detection equipment (FOMAT model no V3.5 and standard software included with the FOMAT equipment) and choice time was recorded for each case. Choice times were measured in seconds and it represents the time it takes each foaming mass to reach 80% of the full height. T1 is recorded as the choice time for a premix that was assembled and immediately foamed, and T2 is the choice time after 7 days of conditioning at 50° C., and T3 is the choice time after 14 days of conditioning at 50° C. The ΔT is the reactivity decay or the difference between T3 and T1. Under these conditions, a ΔT of less than 5 seconds is desired to have suitable system stability. In this example, the amine catalyst is a blend of 55% trisdimethylaminopropylamine, 25% N-hexadecyl, N,N-dimethylamine, and 20% pentamethyldiethyltriamine, and the metal catalyst is dibutyltindiluaralmercaptide. This blend is not inventive as it does not contain a tetraalkylguanidine component, nor does it contain a tertiary amine with an isocyanate reactive group. As illustrated by the table below, this catalyst combination shows a significant loss in reactivity upon aging as evident by the high ΔT of 30 seconds.

| Comparative Catalyst | Use level (PPHP) | T1 (seconds) | T2 (seconds) | T3 (seconds) | ΔT (T3 − T1) (seconds) |
|---|---|---|---|---|---|
| Amine: | | | | | |
| A blend of 55% trisdimethylaminopropylamine, 25% N-hexadecyl-N,N-dimethylamine, and 20% pentamethyldiethyltriamine | 1.39 | 12 | 20 | 42 | 30 |
| Metal: | | | | | |
| Dibutyltindiluaralmercaptide | 0.35 | | | | |

Formulation B was also evaluated on a larger scale by machine spray in order to obtain direct correlation data from the FOMAT reactivity evaluation (ΔT or increase in the time it takes the foam to reach 80% of the maximum height) and the actual foam formulation performance as typically applied in commercial applications.

To conduct the machine spray evaluations, all components of the polyol premix shown in Table 2 for Formulation B were blended together in a five-gallon metal pail and mixed for several minutes with an air-powered mixer. Spray evaluations were conducted using Graco-HVR equipment at 23° C. and 40% relative humidity conditions. All formulations were sprayed using a Graco gun equipped with an AR4242 mixing chamber. Machine chamber and hose temperatures were set to 125° F. and the dynamic pressure was kept constant between 1200-1500 psig. Formulations were sprayed in 3 passes approximately 1 inch thick each onto a 2×2 ft² cardboard square bolted on a wood pallet structure horizontal on the floor. Reactivity measurements were conducted by spraying a small amount into a bucket and using a wooden tongue depressor to measure cream time, string-gel time, and tack-free time (in accordance with the method described below)The reactivity measurements in these spray trials were conducted in triplicate and the average for each sample recorded. The initial reactivity measurements were conducted the same day the polyol premix was formulated together. The reactivity measurements on the aged samples were prepared by crimping shut the 5 gallon pail with the fully formulated polyol premix and placing the pail a 50° C. oven for 2 weeks. The polyol premix was then allowed to return to room temperature before spraying.

Cream time is the amount of time it takes for the sprayed liquid to begin react and foam on the substrate, measured in seconds. The cream time of a spray foam formulation is preferably between 0.2 and 3 seconds. If the cream time is too long, the formulation will not have adequate viscosity to remain in the desired place and may drip or run off or down the substrate. The string gel time is measured as the time it takes (in seconds) for the sprayed liquid to react enough that the liquid begins to gel, and a string of polymer can be pulled from the foaming mass by touching it with a tongue depressor and pulling away from the foam. It is preferable that the string gel time be between 4 seconds and 15 seconds. If the string gel time is less than 4 seconds, the foaming mass can gel before it is done rising, creating pressure in the foam. If the string gel time is greater than 15 seconds, the foaming mass can sag or fall back on itself if the polymerization reaction has not progressed to the point where the foam can withstand its own weight. The tack free time is the time it takes (in seconds) for the sprayed liquid to react to the point where the foamed mass will no longer stick to a tongue depressor when lightly tapped on the surface of the foam. The tack free time is preferably between 5 and 20 seconds.

The results in the table below illustrate the significant decay of the reactivity of the comparative system after storage at 50° C. for two weeks.

| Comparative Catalyst | Cream Time Initial (seconds) | Cream Time Aged 50° C. 2 weeks (seconds) | String Gel Time Initial (seconds) | String Gel Time Aged 50° C. 2 weeks (seconds) | Tack Free Time Intial (seconds) | Tack Free Time Aged 50° C. 2 weeeks (seconds) |
|---|---|---|---|---|---|---|
| Amine: total 1.39 PPHP | | | | | | |
| A blend of 55% trisdimethylaminopropylamine, 25% N,N-Dimethylcetylamine, and 20% pentamethyldiethyltriamine Metal: total 0.35 PPHP | 1.2 | 3.6 | 4.9 | 20.4 | 7.5 | 30.6 |
| Dibutyltindiluaralmercaptide | | | | | | |

EXAMPLE 9 (Inventive)

Evaluation of Formulations Containing Tetramethylguanidine and an Amine Catalyst with an Isocyanate Reactive Group in the Presence of HFO as Blowing Agent trans-1-chloro-3,3,3-trifluoropropene in Formulation B In this inventive example, the amine catalyst is a blend of dimethylaminoethoxyethanol (a tertiary amine catalyst with an isocyanate reactive group), tetramethylguanidine (a tetraalkylguanidine), and the tertiary amine catalyst 1,2-dimethyl imidazole. The catalyst composition further comprises the diluent diethylene glycol. A metal co-catalyst is also used in this example, and is a combination of the pivalate salt of potassium and bismuth neodecanoate.

The ΔT, or the change in time it took the foam to reach 80% of the maximum height after storage for 2 weeks at 50° C., is shown in the table below. This catalyst combination shows good reactivity stability with a ΔT of less than 5 seconds.

| Comparative Catalyst | Use level (PPHP) | T1 (seconds) | T2 (seconds) | T3 (seconds) | ΔT (T3 − T1) (seconds) |
|---|---|---|---|---|---|
| Amine: | | | | | |
| A blend of 33% Dimethylaminoethoxyethanol, 33% tetramethylguanidine, 24% 1,2-dimthylimidazole, and 10% Diethylene glycol Metal: | 2.64 | 17 | 19 | 21 | 4 |
| 40% potassium pivalate, 14% bismuth neodecanoate, and 21% glycol | 0.35 | | | | |

This inventive catalyst composition was also evaluated in Formulation B by machine spray by the method described in Example 8. The cream time, string gel time, and tack free time were all measured and the initial reactivity compared to that of the system stored at 50° C. for two weeks. The results shown in the table below confirm that the inventive catalyst composition exhibits superior stability to that of the comparative Example 8.

| Comparative Catalyst | Cream Time Initial (seconds) | Cream Time Aged 50° C. 2 weeks (seconds) | String Gel Time Initial (seconds) | String Gel Time Aged 50° C. 2 weeks (seconds) | Tack Free Time Intial (seconds) | Tack Free Time Aged 50° C. 2 weeeks (seconds) |
|---|---|---|---|---|---|---|
| Amine: total 2.64 PPHP | | | | | | |
| A blend of 33% Dimethylaminoethoxyethanol, 33% tetramethylguanidine, 24% 1,2-dimthylimidazole, and 10% Dipropylene glycol Metal: total 0.35 PPHP | 1.4 | 1.6 | 7.5 | 10.5 | 11.7 | 17.1 |
| 40% potassium pivalate, 14% bismuth neodecanoate, and 21% glycol | | | | | | |

While the invention has been described with reference to certain aspects, it will be understood by those skilled in the art that various changes may be made and equivalents may be substituted for elements thereof without departing from the scope of the invention. The various aspects disclosed herein can be used alone or in singular or multiple combinations with each other. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and combinations thereof falling within the scope of the appended claims.

The following is claimed:

1. A polyol premix composition comprising at least one halogenated blowing agent, at least one polyol, water, and a catalyst composition comprising equal amounts of tetramethylguanidine and N,N-dimethylaminoethyl-N'-methyl ethanolamine.

2. A polyol premix composition comprising at least one halogenated blowing agent, at least one polyol, water, and a catalyst composition comprising at least 10 wt % tetramethylguanidine and about 10 to about 90 wt % of one or more of a tertiary amine catalyst with an isocyanate reactive group selected from the group consisting of N,N-bis(3-dimethylaminopropyl)-N-isopropanolamine, N,N-dimethylaminoethyl-N'-methyl ethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis (3-dimethylaminopropyl)urea, bis(dimethylamino)-2-propanol, N-(3-aminopropyl)imidazole), N-(2-hydroxypropyl)imidazole, and N-(2-hydroxyethyl)imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, and combinations thereof.

3. A polyol premix composition of claim 2 in which the halogenated blowing agent contains a hydrohaloolefin.

4. The polyol premix of claim 3 in which the hydrohaloolefin blowing agent comprises trans-1-chloro-3,3,3-trifluoropropene.

5. The pre-mix composition of claim 2 wherein the catalyst composition further comprises about 10 to about 80 wt % of a tertiary amine catalyst that does not have an isocyanate reactive group selected from the group consisting of dimethylcyclohexylamine, dicyclohexylamine, pentamethyldiethylenetriamine, bis(3-dimethylaminopropyl)-N,N-dimethylpropanediamine, N-hexadexyl-N,N-dimethylamine, 1,2-dimethylimidazole, 1-methylimidazole, 2-methylimidazole, 2-isopropylimidazole, 2-ethyl-4-methylimidazole, and combinations thereof.

6. The pre-mix composition of claim 5 where the tertiary amine catalyst that does not have an isocyanate reactive group is 1,2-dimethylimidazole.

7. The pre-mix composition of claim 2 where the catalyst composition comprises equal amounts of tetramethylguanidine, dimethylaminoethoxyethanol, and a solution of about 70 wt % 1,2-dimethylimidazole in a glycol.

8. The pre-mix composition of claim 2 further comprising at least one metal catalyst.

9. The premix of claim 8 where the metal catalyst comprises at least one organotin compound.

10. The premix of claim 8 where the metal catalyst comprises a carboxylate complex of one or more of potassium, bismuth or sodium.

11. The premix of claim 2 further comprising a quaternary ammonium salt.

12. The pre-mix composition of claim 2 further comprising at least one cell stabilizer.

13. The pre-mix composition of claim 2 wherein the catalyst comprises about 0.1 to about 10% of the polyol premix composition.

14. The pre-mix composition of claim 2 wherein the catalyst comprises about 0.5 to about 5% of the polyol premix composition.

15. A method for making foam comprising contacting the pre-mix composition of claim 1 with at least one isocyanate.

16. A polyol premix composition comprising at least one halogenated blowing agent, at least one polyol, water, and a catalyst composition consisting of at least 10 wt % tetramethylguanidine and about 10 to about 90 wt % of one or more of a tertiary amine catalyst with an isocyanate reactive group selected from the group consisting of N,N-bis(3-dimethylaminopropyl)-N-isopropanolamine, N,N-dimethylaminoethyl-N'-methyl ethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis(3-dimethylaminopropyl)urea, bis(dimethylamino)-2-propanol, N-(3-aminopropyl)imidazole), N-(2-hydroxypropyl)imidazole, and N-(2-hydroxyethyl)imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, and combinations thereof.

* * * * *